J. S. Tibbals,
Dinner Pail,
Nº 69,272.    Patented Sep. 24, 1867.
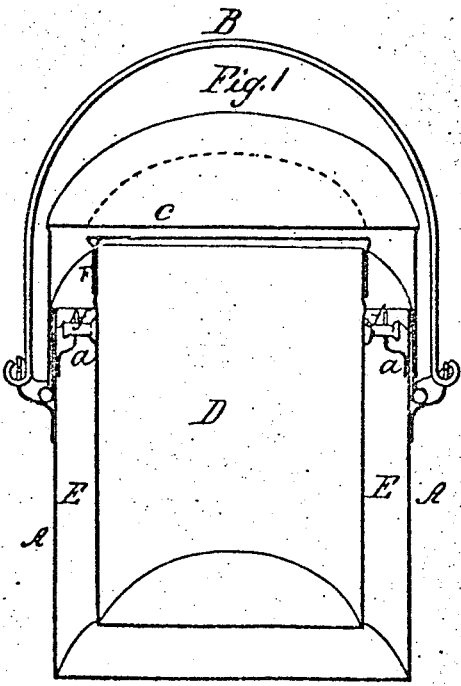
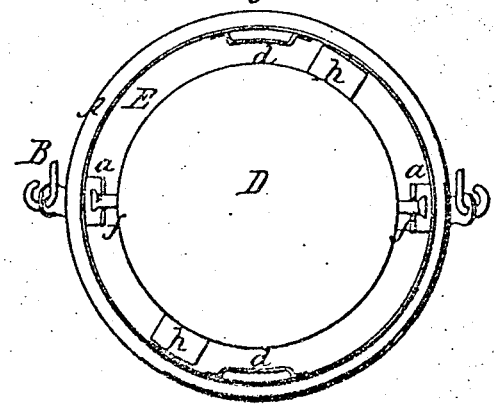
Witnesses
John H. Shumway
A. J. Tibbits
Inventor
James S. Tibbals
By his Attorney,
John E. Earle

United States Patent Office.

JAMES S. TIBBALS, OF MILFORD, CONNECTICUT.

Letters Patent No. 69,272, dated September 24, 1867.

---

IMPROVED LUNCH-BOX.

---

*The Schedule referred to in these Letters Patent and making part of the same.*

---

TO ALL WHOM IT MAY CONCERN:

Be it known that I, JAMES S. TIBBALS, of Milford, in the county of New Haven, and State of Connecticut, have invented a new improvement in Lunch-Box; and I do hereby declare the following, when taken in connection with the accompanying drawings, and the letters of reference marked thereon, to be a full, clear, and exact description of the same, and which said drawings constitute part of this specification, and represent, in—

Figure 1, a vertical central section, and in

Figure 2 a top view, the cover removed.

This invention, though designed especially for the use of mechanics and others who are compelled to carry with them to their place of employment their lunch, is applicable for many other purposes, the object being to produce a vessel in which articles may be preserved at nearly the same temperature in which they are placed in the vessel, whether hot or cold, and consists in suspending a vessel within another, so as to leave a space entirely around the inner vessel, so that no external air can come in contact with the inner vessel.

To enable others to construct my improvement, I will proceed to describe the same, as illustrated in the accompanying drawing.

A is the outer vessel, formed usually of tin or similar material, and provided with a bail, B, and cover, C, similar in construction to an ordinary tin kettle. Within the outer kettle are arranged, upon opposite sides, projecting hooks $a$ or loops $d$. D is the inner vessel, formed of suitable material, and of less dimensions than the vessel A, so as to leave a space, E, entirely around and beneath the inner vessel, as denoted in the drawings, and upon opposite sides of the inner vessel, and corresponding to the hooks $a$, are arranged trunnions $f$, so as to rest in the said hooks, and maintain the inner vessel in an upright position, whatever may be the position of the outer vessel; (this construction is designed with special reference to the carrying of liquids;) or hooks $h$ may be arranged upon opposite sides of the inner vessel, so as to set into the loops $d$, and so maintain the vessel. I prefer, however, the trunnions as first described. The inner vessel I provide with a cover, F, as seen in fig. 1, so as to leave a space between the top of the inner vessel and the cover of the outer. By this construction, the article or fluid placed within the inner vessel will be kept entirely from contact with the outer air, and thus retain nearly the same temperature as when placed within the vessel, whether it be hot or cold. The inner vessel is arranged so as to be easily removed from the outer, and thus is formed a most convenient and perfect lunch-box.

I do not broadly claim the arrangement of one cylinder within another, as such are common in cream-freezers and coolers.

Having thus fully described my invention, what I claim as new and useful, and desire to secure by Letters Patent, is—

The vessels A and D, constructed and arranged the one within the other, the pail D being suspended by the hooks $a$ and trunnions $f$, and provided with a cover, so as to form a space entirely around the inner vessel, and so that the said inner vessel may be removed as described, and the outer vessel provided with a bail, B, the whole constructed and arranged in the manner described.

JAMES S. TIBBALS.

Witnesses:
JOHN H. SHUMWAY,
A. J. TIBBITS.